United States Patent
Zhang et al.

(10) Patent No.: US 7,039,638 B2
(45) Date of Patent: May 2, 2006

(54) DISTRIBUTED DATA CLUSTERING SYSTEM AND METHOD

(75) Inventors: Bin Zhang, Fremont, CA (US);
Meichun Hsu, Los Altos, CA (US);
George Forman, Port Orchard, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1000 days.

(21) Appl. No.: 09/844,730

(22) Filed: Apr. 27, 2001

(65) Prior Publication Data

US 2003/0018637 A1 Jan. 23, 2003

(51) Int. Cl.
*G06F 17/30* (2006.01)

(52) U.S. Cl. .............................. 707/7; 707/10; 707/100; 707/200; 707/102

(58) Field of Classification Search ............. 707/7, 707/10, 100, 200, 102, 3, 6, 101, 189; 714/4; 709/230; 706/59; 375/240.12, 224
See application file for complete search history.

(56) References Cited

U.S. PATENT DOCUMENTS

| | | | | |
|---|---|---|---|---|
| 5,333,147 A | * | 7/1994 | Nohara et al. | 375/224 |
| 6,012,058 A | * | 1/2000 | Fayyad et al. | 707/6 |
| 6,263,337 B1 | * | 7/2001 | Fayyad et al. | 707/6 |
| 6,269,376 B1 | * | 7/2001 | Dhillon et al. | 707/101 |
| 6,425,014 B1 | * | 7/2002 | Aiken et al. | 709/230 |
| 6,453,426 B1 | * | 9/2002 | Gamache et al. | 714/4 |
| 6,496,834 B1 | * | 12/2002 | Cereghini et al. | 707/102 |
| 6,519,591 B1 | * | 2/2003 | Cereghini et al. | 707/6 |
| 6,542,546 B1 | * | 4/2003 | Vetro et al. | 375/240.12 |
| 6,584,433 B1 | * | 6/2003 | Zhang et al. | 702/189 |
| 6,615,205 B1 | * | 9/2003 | Cereghini et al. | 707/3 |
| 2002/0049692 A1 | * | 4/2002 | Venkatram | 706/59 |
| 2003/0154181 A1 | * | 8/2003 | Liu et al. | 707/1 |

OTHER PUBLICATIONS

"Parallel Implementation of Vision Algorithms on Workstation Clusters," by D. Judd, N. K. Ratha, P. K. McKinley, J. Weng, and A. K. Jain, Proceedings of the 12th International Conference on Pattern Recognition, Jerusalem, Israel, Oct. 1994.

"Performance Evaluation of Large–Scale Parallel Clustering in NOW Environments," by D. Judd, P. K. McKinley, and A. K. Jain, Proceedings of the Eighth SIAM Conference on Parallel Processing for Scientific Computing, Minneapolis, Minnesota, Mar. 1997.

"Parallel K–means Clustering Algorithm on NOWs," by Sanpawat Kantabutra and Alva L. Couch, NECTEC Technical Journal, vol. 1, No. 1, Mar. 1999.

* cited by examiner

*Primary Examiner*—Frantz Coby (57) ABSTRACT

A distributed data clustering system having an integrator and at least two computing units. Each computing unit is loaded with common global parameter values and a particular local data set. Each computing unit then generates local sufficient statistics based on the local data set and global parameter values. The integrator employs the local sufficient statistics of all the computing units to update the global parameter values.

18 Claims, 6 Drawing Sheets

DISTRIBUTED DATA CLUSTERING SYSTEM AND METHOD

FIELD OF THE INVENTION

The present invention relates generally to data clustering and more specifically to a method and system for distributed data clustering.

BACKGROUND OF THE INVENTION

There has been the general notion of performing the data clustering in parallel by more than one computer to increase the efficiency of the data clustering. This is particularly important as the data sets increase in the number of data points that need to be clustered, and the case of naturally distributed data (e.g., data for an international company with offices in many different offices located different countries and locations). Unfortunately, the known data clustering techniques were developed for execution by a single processing unit. Furthermore, although there have been attempts to make these known data clustering techniques into parallel techniques, as described in greater detail hereinbelow, these prior art approaches to formulate a parallel data clustering technique offer only tolerable solutions, each with its own disadvantages, and leaves much to be desired.

One prior art approach proposes a parallel version of the K-Means clustering algorithm. The publication entitled, "Parallel Implementation of Vision Algorithms on Workstation Clusters," by D. Judd, N. K. Ratha, P. K. McKinley, J. Weng, and A. K. Jain, Proceedings of the $12^{th}$ International Conference on Pattern Recognition, Jerusalem, Israel, October 1994 describes parallel implementations of two computer vision algorithms on distributed cluster platforms. The publication entitled, "Performance Evaluation of Large-Scale Parallel Clustering in NOW Environments," by D. Judd, P. K. McKinley, and A. K. Jain, Proceedings of the Eighth SIAM Conference on Parallel Processing for Scientific Computing, Minneapolis, Minnesota, March 1997 further presents the results of a performance study of parallel data clustering on Network of Workstations (NOW) platforms.

Unfortunately, these publications do not formalize the data clustering approach. Furthermore, the procedure for K-Means is described in a cursory fashion without explanation of how the procedure operates. Also, the publications are silent about whether the distributed clustering technique can be generalized, and if so, how the generalization can be performed, thereby limiting the applicability of the Judd approach to K-Means data clustering.

Another prior art approach proposes non-approximated, parallel versions of K-Means. The publication, "Parallel K-means Clustering Algorithm on NOWs," by Sanpawat Kantabutra and Alva L. Couch, NECTEC Technical Journal, Vol. 1, No. 1, March 1999 describes an example of this approach. Unfortunately, the Kantabutra and Couch algorithm requires re-broadcasting the entire data set to all computers for each iteration. Consequently, this approach may lead to heavy congestion in the network and may impose a communication overhead or penalty. Since the trend in technology is for the speed of processors to improve faster than the speed of networks, it is desirable for a distributed clustering method to reduce the amount of data that needs to be communicated between the computers in the network.

Furthermore, the number of slave computing units in this algorithm is limited to the number of clusters to be found.

Also, an analytical and empirical analysis of this approach estimates a 50% utilization of the processors. It would be desirable for a distributed clustering method that has a greater percentage of utilization of the processors.

Accordingly, there remains a need for a method and system for data clustering that can utilize more than one computing unit for concurrently processing the clustering task and that overcomes the disadvantages set forth previously.

SUMMARY OF THE INVENTION

According to one aspect of the present invention, a distributed data clustering method and system are provided for performing the data clustering in a parallel fashion instead of a sequential fashion.

According to another aspect of the present invention, a distributed data clustering method and system are provided for utilizing a network of computing resources that are either homogenous computing resources or heterogeneous computing resources.

According to yet another aspect of the present invention, a distributed data clustering method and system are provided for using a network of computers to efficiently process large data sets that need to be clustered.

According to another aspect of the present invention, a distributed data clustering method and system are provided for using a network of computers to efficiently process non-distributed data that need to be clustered.

According to yet another aspect of the present invention, a distributed data clustering method and system are provided for using a network of computers to efficiently process naturally distributed data that need to be clustered.

A distributed data clustering system having an integrator and at least two computing units. Each computing unit is loaded with common global parameter values and a particular local data set. Each computing unit then generates local sufficient statistics based on the local data set and global parameter values. The integrator employs the local sufficient statistics of all the computing units to update the global parameter values.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. The following description and the drawings are illustrative of the invention and are not to be construed as limiting the invention.

Homogenous Distributed Data Clustering System 100

Figure 1:
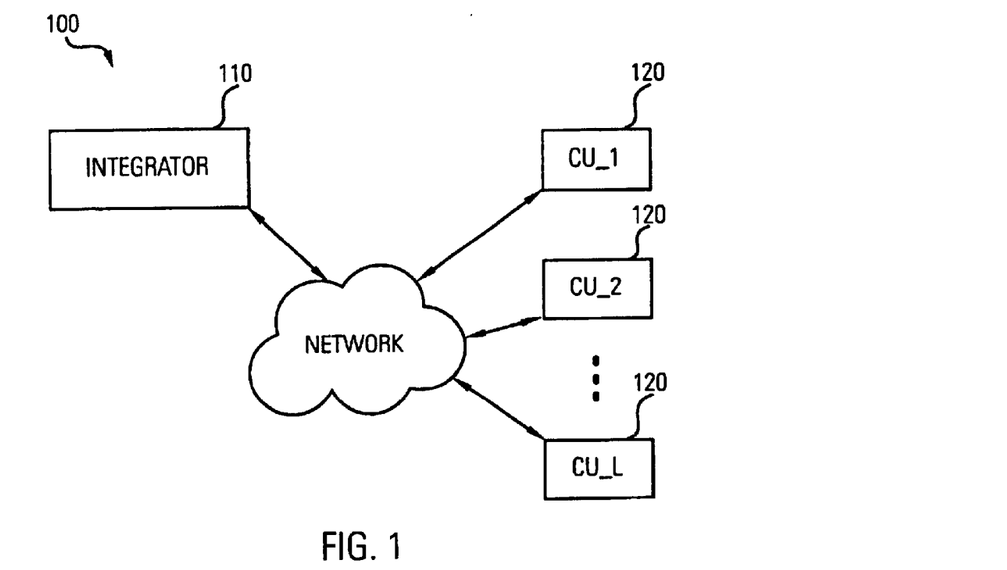
FIG. 1 illustrates a distributed data clustering system configured in accordance with one embodiment of the present invention, where the distributed data clustering system has homogenous computing components.

FIG. 1 illustrates a distributed data clustering system 100 configured in accordance with one embodiment of the present invention, where the distributed data clustering system has homogenous computing components. The system 100 includes an integrator 110 and at least two computing units 120 that communicate via a network. In this example, there is a plurality of computing units 120 (e.g., L computing units labeled CU_1, CU_2 . . . , CU_L). The computing units 120 can be disposed in a distributed fashion and be remote from the integrator 110 and from the other computing units 120. It is noted that there can be a single computing unit 120 in a particular location, or a plurality of computing units 120 can be disposed in a particular location. It is noted that the integrator 110 can be implemented by a computing unit 120 that executes an integration program as described in greater detail hereinafter.

It is noted that the computing units 120 in this system are homogenous in nature (i.e., similar in processing capabilities, hardware configuration, etc.). In a system having a plurality of homogenous computing units 120, the processing can be divided evenly among the units 120. However, as described in greater detail hereinafter, when the computing units 120 are not homogenous, there may be an opportunity to allocate the processing task in such a manner as to consider the computing power of the computing unit.

Heterogeneous Distributed Data Clustering System

Figure 2:
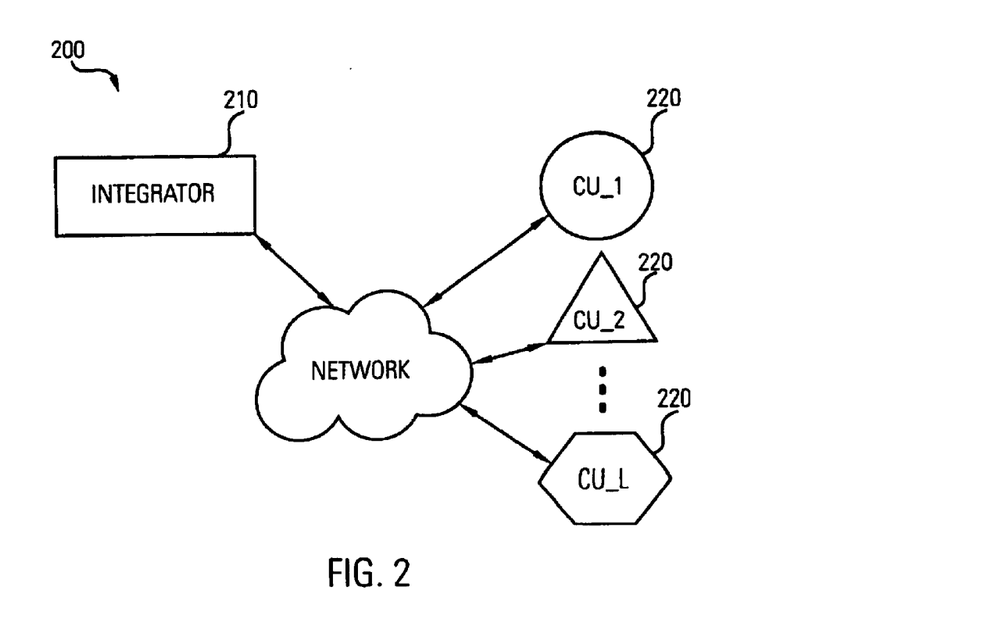
FIG. 2 illustrates a distributed data clustering system configured in accordance with an alternative embodiment of the present invention, where the distributed data clustering system has heterogeneous computing components.

FIG. 2 illustrates a distributed data clustering system 200 configured in accordance with an alternative embodiment of the present invention, where the distributed data clustering system has heterogeneous computing components.

It is noted that the computing components (e.g., computing units 220 and integrator 210) in the system are heterogeneous in nature. In this embodiment, at least one or more of the computing components is different from the other components. For example, the computing components can be different in processing capabilities, hardware configuration, etc. In a distributed data clustering system having heterogeneous computing components, it is preferable to assign a particular processing task to a specific computing unit based on the requirements of the processing task and the processing power of the computing unit. Specifically, the processing power and capabilities of the computing units can be correlated to the specific requirements of the computation tasks when assigning different projects to the different units.

For example, more powerful computing units can be assigned a greater number of data points to process, and a less powerful computing units can be assigned a fewer number of data points to process so that all the computing units complete execution of their respective assigned tasks at about the same time. By so doing, the system can more efficiently manage the load of the clustering task and reduce the amount of time waiting for partial results that are needed to generate the final result.

Integrator

Figure 3:
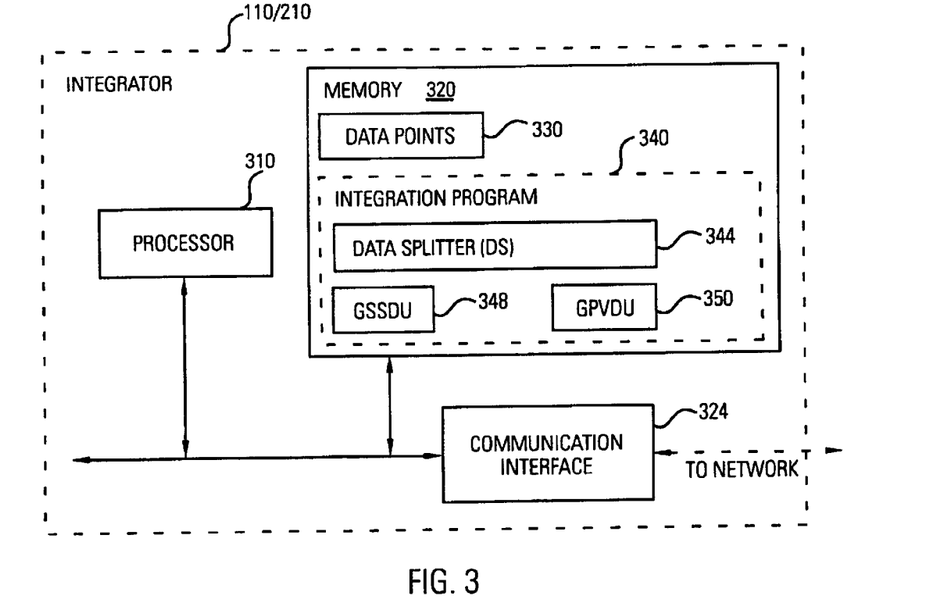
FIG. 3 is a block diagram illustrating in greater detail the integrator of FIG. 1 or FIG. 2 in accordance with one embodiment of the present invention.

FIG. 3 is a block diagram illustrating in greater detail the integrator 110 or 210 of FIG. 1 or FIG. 2, respectively, in accordance with one embodiment of the present invention. The integrator 110 or 210 includes a processor 310 for executing computer programs and a memory 320 for storing information and programs. The memory 320 includes data points 330 to be clustered and an integration program 340.

When executing on the processor 310, the integration program 340 provides different data points common parameters (e.g., global parameter values) to each of the computing units, receives local information provided by the computing units 120, integrates the local information to generate global sufficient statistics, and based thereon updates the global parameter values (GPVs) that are subsequently provided to each of the computing units 120 for a next iteration. The distributed clustering method is described in greater detail hereinafter with reference to FIG. 6.

The integration program 340 includes a data splitter (DS) 344 for splitting the data points 330 into local data points that are provided to a particular computing unit. The integration program 340 also includes a global sufficient statistics determination unit (GSSDU) 348 for receiving the local sufficient statistics from the computing units and based thereon generates global sufficient statistics. The integration program 340 includes a global parameter value determination unit (GPVDU) 350 for receiving the global sufficient statistics from the GSSDU and based thereon for generating the global parameter value (GPV) that are subsequently provided to each of the computing units in the next iteration. The computing unit is described in greater detail hereinafter with reference to FIG. 4, and the information communicated between the integration program 340 and the computing program 438 is described in greater detail hereinafter with reference to FIG. 5.

A communication interface (I/F) 324 is also provided for the integrator 110 or 210 to communicate with the computing units through a network.

Computing Unit

Figure 4:
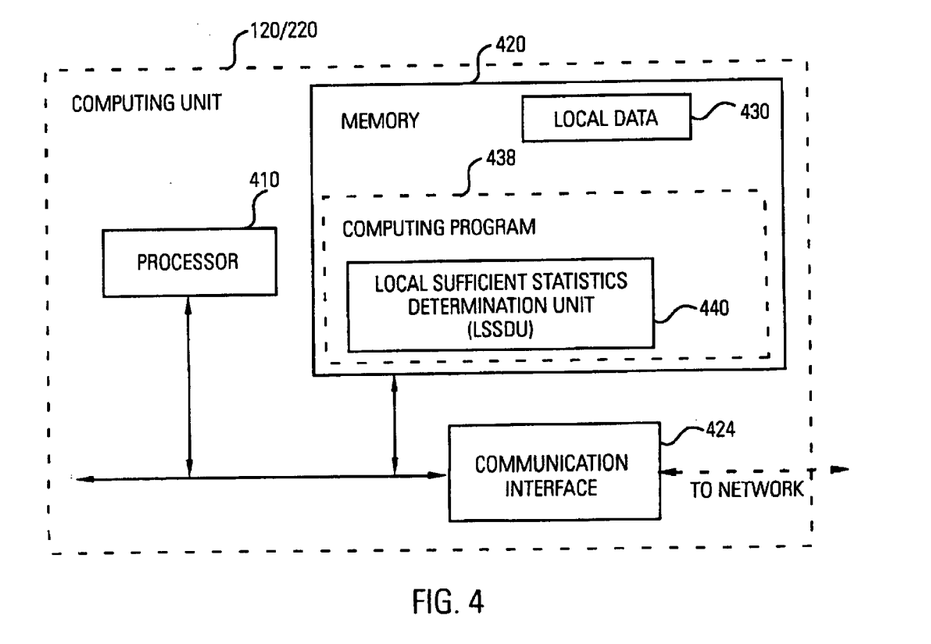
FIG. 4 is a block diagram illustrating in greater detail a computing unit of FIG. 1 or FIG. 2 in accordance with one embodiment of the present invention.

FIG. 4 is a block diagram illustrating in greater detail a computing unit 120 or 210 of FIG. 1 or FIG. 2 in accordance with one embodiment of the present invention. The computing unit 120 or 210 includes a processor 410 for executing computer programs and a memory 420 for storing information and programs. The memory 420 includes local data 430 and a computing program 438.

When executing on the processor 310, the computing program 438 receives the global parameters (e.g., center locations) and the data points assigned to this computing unit, and generates local information (e.g., local sufficient statistics) and based on these inputs.

The computing program 438 includes a local sufficient statistics determination unit (LSSDU) 440 for determining local sufficient statistics based on the inputs. The LSS are subsequently provided to the integrator for further processing. A communication interface (I/F) 424 is also provided for the computing unit 120 or 220 to communicate with the integrator through a network.

Figure 5:
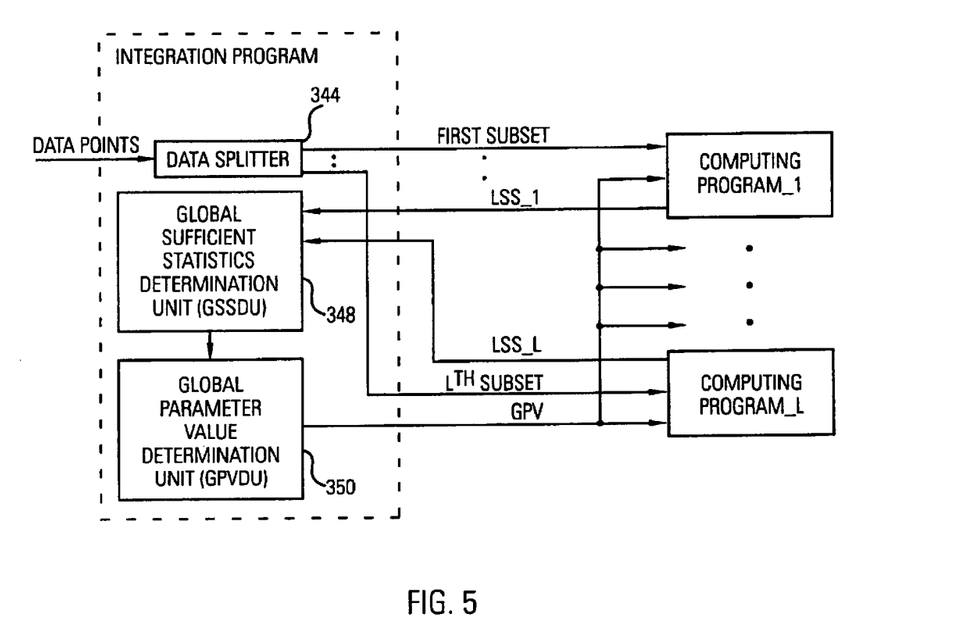
FIG. 5 is a block diagram illustrating the information communicated between the integration program and computing program according to one embodiment of the present invention.

FIG. 5 is a block diagram illustrating the information communicated between the integration program and computing program according to one embodiment of the present invention. The data splitter 344 receives the data points that need to be clustered and partitions the data points in a plurality of subsets of data points (e.g., local data_1, local data_2, local data_L). Each of these subsets of local data are then provided to a designated computing unit as shown. It is also noted that each of the computing units also receives common global parameter values (e.g., the initial or updated center locations). Based on the GPV and the specific local data, each computing unit generates local sufficient statistics (LSS) and provides the same to the GSSDU 348.

The GSSDU 348 receives the local sufficient statistics (LSS), such as LSS_1, LSS_2, LSS_L, from each of the computing units (1 to L), respectively, and generates global sufficient statistics (GSS) based thereon. The GPVDU 350 receives the GSS and employs the GSS to update or revise the GPV, which is subsequently provided to the computing units in the next iteration.

The distributed clustering technique of the present invention is especially suited to handle naturally distributed data or data where the number of data points is too large for a single processor or computing machine to handle. In the first case, distributed clustering technique of the present invention is well suited to process naturally distributed data. An example of naturally distributed data is customer data, sales data, and inventory data for an international company with offices in many different offices located different countries and locations. In such an example, the data splitter 344 is not needed and each computing unit can have access to its own local data. In response to the local data and GPV provided by GPVDU 350, each computing unit generates local sufficient statistics to provide to GSSDU 348.

In this second case, the data is split into manageable tasks where each task can be adequately processed by the computing units. In this manner, a task that may be too big for any one computing unit can be split into sub-tasks that can be efficiently processed by each of the computing units.

Distributed Clustering Method

Figure 6:
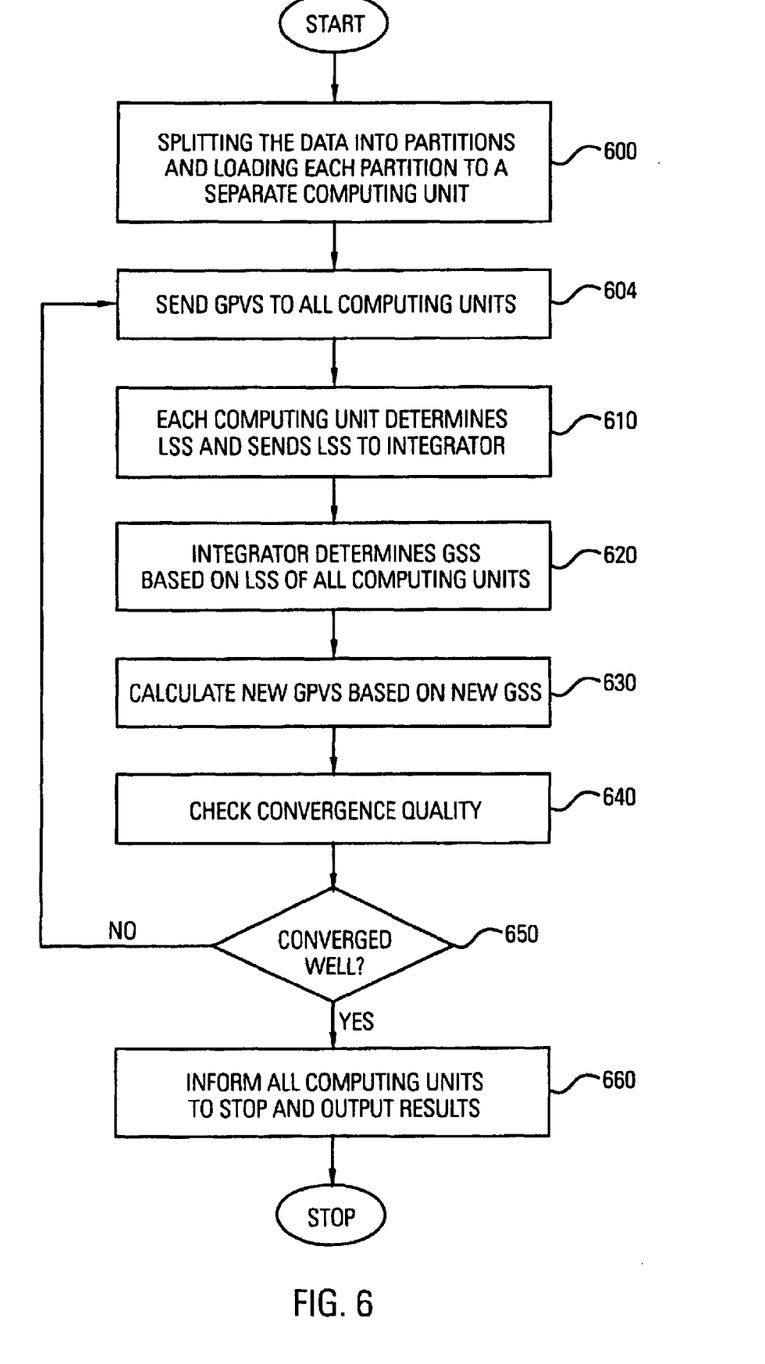
FIG. 6 is a flowchart illustrating the processing steps performed by the distributed data clustering system according to one embodiment of the present invention.

FIG. 6 is a flowchart illustrating the distributed clustering method according to one embodiment of the present invention. In step 600, a data set having a plurality of data points is partitioned into at least two partitions or sub-sets of data points. In this example, there are L partitions or sub-sets of data points corresponding to L computing units.

By finding K centers (local high densities of data), $M=\{m_i | i=1, \ldots, K\}$, the data set, $S=\{x_i | i=1, \ldots, N\}$, can be partitioned either into discrete clusters using the Voronoi partition (each data item belongs to the center that it is closest to, as in K-Means) or into fuzzy clusters given by the local density functions (as in K-Harmonic Means or EM).

Step 600 can also include the step of loading the partitions into respective computing units and initializing the global parameter values (GPVs). It is noted that the step of splitting the data into partitions may be optional since the data may be naturally distributed.

In step 604, the GPVs are sent to all the computing units. In step 610, each computing unit determines local sufficient statistics (LSS) based on the received GPVs sent by the integrator and the specific partition or sub-set of data points loaded by the integrator. The LSS are then sent to the integrator.

As used herein the term "sufficient statistics" shall be defined as follows: quantities S can be called sufficient statistics of F, if the value of F can be uniquely calculated or determined from S without knowing any other information. In other words, S is sufficient for calculating F. For further information regarding sufficient statistics, please refer to Duda & Hart, "Pattern Classification and Scene Analysis," John Wiley & Sons, pages 59–73.

In step 620, the integrator receives the LSS from each of the L computing units and based thereon generates global sufficient statistics (GSS). The LSS from the computing units are "integrated" to generate GSS. In step 630, the GSS are utilized to generate updated global parameter values (GPVs).

In step 640, the integrator checks the convergence quality of the resulting center locations from the current iteration. In step 650, a determination is made whether the convergence quality meets a predetermined standard. If the convergence quality meets the predetermined standard, processing proceeds to step 660 where the computing units 120 are instructed to stop processing and the center locations are provided as outputs. If the convergence quality does not meet the predetermined standard, processing proceeds to step 604 where are provided to the computing units 120 in preparation for a next iteration.

Timeline for Network without a Broadcast Feature

Figure 7:
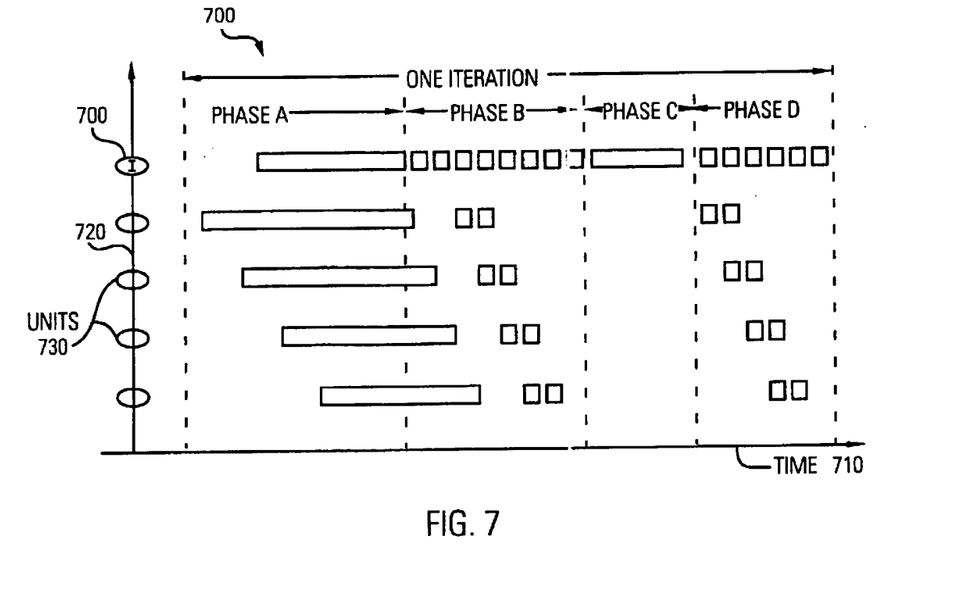
FIG. 7 illustrates an exemplary timeline for a single iteration of the distributed clustering method in a network without a broadcasting feature.

FIG. 7 illustrates an exemplary timeline 700 for a single iteration of the distributed clustering method in a network without a broadcasting feature. The horizontal axis 710 represents time, and the vertical axis 720 represents a plurality of computing units. Each iteration can be divided into four phases. In phase A, data set re-partitioning and local sufficient statistics collection are performed. In phase B, the local sufficient statistics are sent across the network to the integrator. In phase C the integrator performs integration of the LSSs and generation of updated GPVs. In phase D, the integrator propagates the updated GPVs to each of the computing units.

The first computing unit 740 is assigned the duties of the integrator. Consequently, the first computing unit 740 is provided with a lighter load of data (e.g., a partition or sub-set of data having fewer data points). The slope of the line indicated in phase B is generally different from the slope of the line indicated in phase D since the amount of data that is sent by the integrator to the computing units is not the same as the data that is sent by the computing units to the integrator.

Timeline for Network with Broadcast Feature

Figure 8:
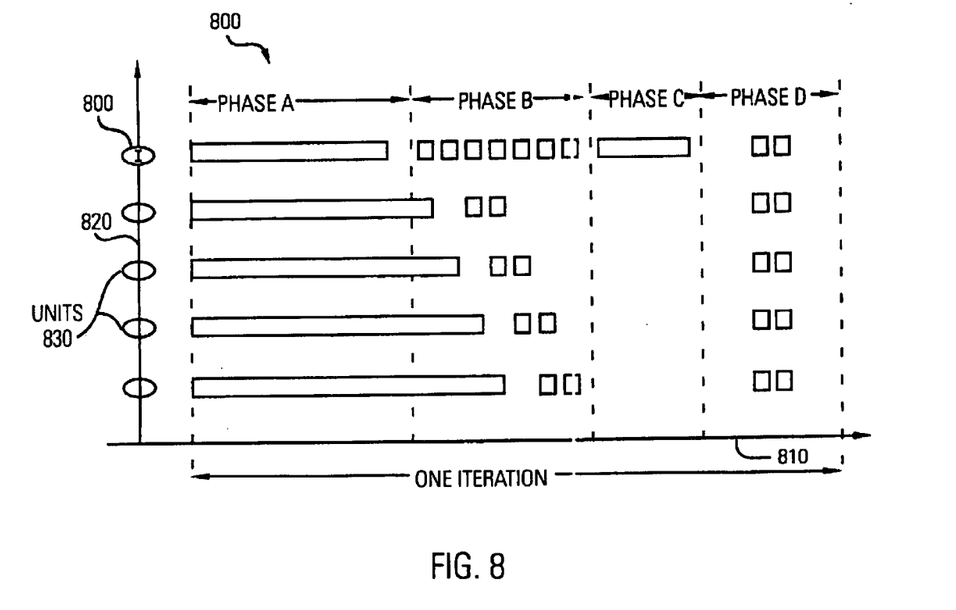
FIG. 8 illustrates a timeline for a single iteration of the distributed clustering method in a network with a broadcasting feature.

FIG. 8 illustrates a timeline 800 for a single iteration of the distributed clustering method in a network with a broadcasting feature. The horizontal axis 810 represents time, and the vertical axis 820 represents a plurality of computing units 830. Each iteration can be divided into four phases. In phase A, data set re-partitioning and local sufficient statistics collection can be performed. In phase B, the local sufficient statistics are sent across the network to the integrator. In phase C the integrator performs integration of the LSSs and generation of updated GPVs. In phase D, the integrator broadcasts the updated GPVs to each of the computing units. The broadcasting feature allows all the computing units to begin phase A at the same time without having a staggered start time as illustrated in FIG. 7.

For example, when the network of computers is Ethernet, the broadcasts can employ the broadcasting features of Ethernet. First, at a low level, there is a broadcast protocol for Ethernet. Second, Parallel Virtual Machine (PVM) and Message Passing Interface (MPI) (and their various implementations) typically have routines to broadcast messages that can be utilized. Third, shared memory protocols also support broadcasting. For example, a network interface card on each host may contain some memory, whose contents are replicated across all cards in the ring of hosts. In this regard, writing into the memory on one card replicates data to all other cards' memories.

Exemplary Data Clustering Systems

Figure 9:
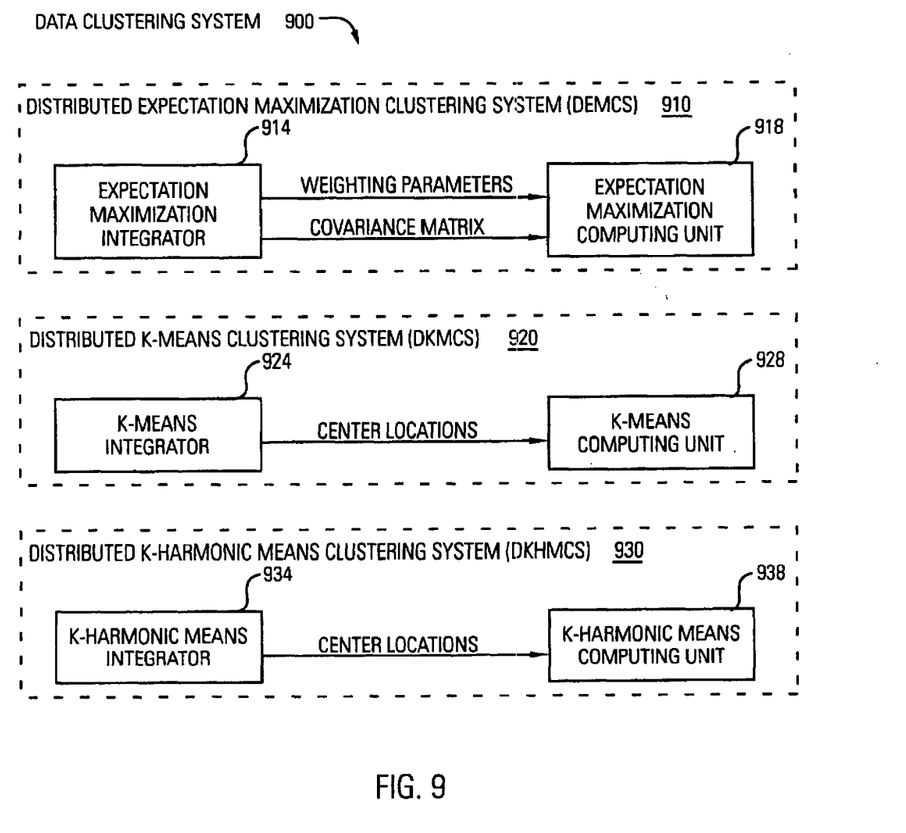
FIG. 9 illustrates exemplary data clustering methods that can be performed in the distributed manner as set forth by the present invention.

FIG. 9 illustrates a data clustering system 900 having exemplary data clustering systems that are implemented in a distributed manner according the present invention. The system 900 can include a distributed expectation maximization clustering system (DEMCS) 910 for implementing an EM clustering algorithm in a distributed manner. The DEMCS 910 includes one or more EM computing units 918 and an EM integrator 914 for providing weighting parameters and a co-variance matrix as global parameter values to the EM computing units 918. For further details regarding the EM clustering algorithm, please refer to Dempster, A. P., Laird, N. M., and Rubin, D. B., "Maximum Likelihood from Incomplete Data via the EM Algorithm", J. of the Royal Stat. Soc., Series B, 39(1):1–38, 1977, and McLachlan, G. J., Krishnan, T., "The EM Algorithm and Extensions", John Wiley & Sons, 1996.

The system 900 can include a distributed K-Means clustering system (DKMCS) 920 for implementing a KM clustering algorithm in a distributed manner. The DKMCS 920 includes one or more KM computing units 928 and a KM integrator 924 for providing center locations as global parameter values to the KM computing units 928. For further details regarding the K-Means clustering algorithm, please refer to "Some methods for classification and analysis of multivariate observations," by J. MacQueen, Proceedings of the 5th Berkeley Symposium on Mathematical Statistics and Probability, Vol. 1., pages 281–297, University of California Press, Berkeley XVII+666 p, 1967.

The system 900 can include a distributed K-Harmonic Means clustering system (DKHMCS) 930 for implementing a KHM clustering algorithm in a distributed manner. The DKHMCS 930 includes one or more KHM computing units 938 and a KHM integrator 934 for providing center locations as global parameter values to the KHM computing units 938. For further details regarding the K-Harmonic Means clustering algorithm, please refer to "K-Harmonic Means—A Data Clustering Algorithm" by Zhang, B., Hsu, M., Dayal, U., Hewlett-Packard Research Laboratory Technical Report HPL-1999-124.

It is noted that other data clustering systems can be implemented in the distributed manner as set forth by the present invention. The distributed data clustering systems 910, 920, 930 implement center-based data clustering algorithms in a distributed fashion. However, these center based clustering algorithms, such as K-Means, K-Harmonic Means and EM, have been employed to illustrate the parallel algorithm for iterative parameter estimations of the present invention. In these examples, the center locations are the parameters, which are estimated through many iterations. However, the distributed iterative parameter estimation techniques of the present invention are not limited to application to clustering algorithms.

A Class of Center-Based Algorithms

Let $R^{dm}$ be the Euclidean space of dimension dim; S $\subseteq R^{dm}$ be a finite subset of data of size $N=|S|$; and $M=\{m_k | k=1, \ldots, K\}$, the set of parameters to be optimized. For example, the parameter set M consists of K centroids for K-Means, K centers for K-Harmonic Means, and K centers with co-variance matrices and mixing probabilities for EM The performance function and the parameter optimization step for this class of algorithms can be written in terms of SS. The performance function is decomposed as follows:

Performance Function $$F(S, M) = f_0\left(\sum_{x \in S} f_1(x, M), \sum_{x \in S} f_2(x, M), \ldots, \sum_{x \in S} f_R(x, M)\right) \quad (1)$$

What is essential here is that $f_0$ depends only on the SS, represented by the sums, whereas the remaining $f_I$ functions can be computed independently for each data point. The detailed form of $f_i$, $i=1, \ldots, R$, depends on the particular performance function being considered, which is described in greater detail hereinafter with examples of K-Means, K-Harmonic Means and EM.

The center-based algorithm, which minimizes the value of the performance function over M, is written as an iterative algorithm in the form of Q SS (I( ) stands for the iterative algorithm, and $$\sum_{x \in S} g_j, j = l, \ldots, Q,$$

, . . . , stands for SS.):

$$M^{(u+1)} = I\left(\sum_{x \in S} g_1(x, M^{(u)}), \sum_{x \in S} g_2(x, M^{(u)}), \ldots, \sum_{x \in S} g_Q(x, M^{(u)})\right). \quad (2)$$

$M^{(u)}$ is the parameter vector after the $u^{th}$ iteration. We are only interested in algorithms that converge: $M^{(u)} \to M$. The values of the parameters for the $0^{th}$ iteration, $M^{(0)}$, are by initialization. One method often used is to randomly initialize the parameters (e.g., centers, covariance matrices and/or mixing probabilities). There are many different ways of initializing the parameters for particular types of center-based algorithms. The set of quantities $$\text{Suff} = \left\{\sum_{x \in S} f_r(x, M) \bigg| r = 1, \ldots, R\right\} \cup \left\{\sum_{x \in S} g_q(x, M) \bigg| q = 1, \ldots, Q\right\}. \quad (3)$$

is called the global SS of the problem (1)+(2). As long as these quantities are available, the performance function and the new parameter values can be calculated, and the algorithm can be carried out to the next iteration. As described in greater detail hereinafter, K-Means, K-Harmonic Means and Expectation-Maximization clustering algorithms all belong to a class defined in (1)+(2).

Parallelism of Center-Based Algorithms

This decomposition of center-based algorithms (and many other iterative parameter estimation algorithms) leads to a natural parallel structure with minimal need for communication. Let L be the number of computing units that has a CPU and local memory (e.g., personal computers (PCs), workstations or multi-processor computers). To utilize all L units for the calculation of (1)+(2), the data set is partitioned into L subsets, $S=D_1 \cup D_2 \cup \ldots \cup D_L$, and the $l^{th}$ subset, $D_l$, resides on the $l^{th}$ unit. It is important not to confuse this partition with the clustering.

This partition is arbitrary and has nothing to do with the clustering in the data. This partition is static. Data points in $D_l$, after being loaded into the memory of the $l^{th}$ computing unit, need not be moved from one computer to another except perhaps for the purpose of load balancing among units, whose only effect is on the execution time of the processors (i.e., load balancing does not affect the algorithm).

The processing unit can be homogeneous processing units or heterogeneous processing units. The sizes of the partitions, $|D_l|$, besides being constrained by the storage of the individual units, are preferably set to be proportional to the speed of the computing units. Such a partition ensures that each unit takes about the same amount of time to finish its computation on each iteration, thereby improving the utilization of all the units. A scaled-down test may be carried out on each computing unit in advance to measure the actual speed (do not include the time of loading data because it is only loaded once at the beginning) or a load balancing over all units could be done at the end of first iteration.

The calculation is carried out on all L units in parallel. Each subset, $D_l$, contributes to the refinement of the parameters in M in exactly the same way as the algorithm would have been run on a single computer. Each unit independently computes its partial sum of the SS over its data partition. The SS of the $l^{th}$ partition are $$Suff_l = \left\{ \sum_{x \in D_l} f_r(x, M) \middle| r = 1, \ldots, R \right\} \cup \left\{ \sum_{x \in D_l} g_q(x, M) \middle| q = 1, \ldots, Q \right\}. \quad (4)$$

One of the computing units is chosen to be the Integrator. The integrator is responsible for summing up the SS from all partitions (4), obtaining the global SS (3); calculating the new parameter values, M; from the global SS; evaluating the performance function on the new parameter values, (2); checking the stopping conditions; and informing all units to stop or sending the new parameters to all computing units to start the next iteration. The duties of the Integrator may be assigned as a part time job to one of the regular units. There may also be more than one computer used as Integrators. The multiple integratos can be organized in a hierarchy if the degree of parallelism is sufficiently high. Special networking support is also an option. If broadcast is supported efficiently, it may be effective to have every node be an Integrator, thereby eliminating one direction of communication.

The Parallel Clustering Algorithm

Step 0: Initialization: Partition the data set and load the $1^{th}$ partition to the memory of the $1^{th}$ computing unit. Use any preferred algorithm to initialize the para-meters, $\{m_k\}$, on the Integrator.

Step 1: Broadcast the integrated parameter values to all computing units.

Step 2: Compute at each unit independently the SS of the local data based on (4).

Step 3: Send SS from all units to the Integrator

Step 4: Sum up the SS from each unit to get the global SS, calculate the new parameter values based on the global SS, and evaluate the performance function. If the Stopping condition is not met, goto Step 1 for the next iteration, else inform all computing units to stop. The stopping condition typically tests for sufficient convergence or the number of iterations.

EXAMPLES

The application of the techniques of the present invention to three exemplary clustering algorithms: K-Means, K-Harmonic Means, and EM, is now described.

K-Means Clustering Algorithm

K-Means is one of the most popular clustering algorithms. The algorithm partitions the data set into K clusters, $S=(S_l, \ldots, S_K)$, by putting each data point into the cluster represented by the center nearest to the data point. K-Means algorithm finds a local optimal set of centers that minimizes the total within cluster variance, which is K-Means performance function:

$$Perf_{KM}(X, M) = \sum_{k=1}^{K} \sum_{x \in S_l} \|x - m_k\|^2, \quad (5)$$

where the $k^{th}$ center, $m_k$, is the centroid of the $k^{th}$ partition. The double summation in (5) can instead be expressed as a single summation over all data points, adding only the distance to the nearest center expressed by the MIN function below:

$$Perf_{KM}(X, M) = \sum_{l=1}^{N} \text{MIN}\{\|x_l - m_l\|^2 \mid l = 1, \ldots, K\}. \quad (6)$$

The K-Means algorithm starts with an initial set of centers and then iterates through the following steps: For each data item, find the closest $m_k$ and assign the data item to the $k^{th}$ cluster. The current $m_k$'s are not updated until the next phase (Step 2).

1. Recalculate all the centers. The $k^{th}$ center becomes the centroid of the $k^{th}$ cluster. This phase gives the optimal center locations for the given partition of data.
2. Iterate through 1 & 2 until the clusters no longer change significantly.

After each phase, the performance value never increases and the algorithm converges to a local optimum. More precisely, the algorithm reaches a stable partition in a finite number of steps for finite datasets. The cost per iteration is $O(K \cdot \dim \cdot N)$.

The functions for calculating both global and local SS for K-Means are the $0^{th}$, $1^{st}$ and $2^{nd}$ moments of the data on the unit belonging to each cluster as shown in (7). Both the K-Means performance function and the new center locations can be calculated from these three moments.

$$\begin{cases} g_1(x, M) = f_1(x, M) = (\delta_1(x), \delta_2(x), \ldots, \delta_K(x)), \\ g_2(x, M) = f_2(x, M) = f_1(x, M) \cdot x, \\ g_3(x, M) = f_3(x, M) = f_1(x, M) \cdot x^2. \end{cases} \quad (7)$$

$\delta_k(x)=1$ if x is closest to $m_k$, otherwise $\delta_k(x)=0$ (resolve ties arbitrarily). The summation of these functions over a data set (see (3) and (4)) residing on the $l^{th}$ unit gives the count, $n_{k,l}$, first moment, $\Sigma_{k,l}$, and the second moment, $s_{k,l}$, of the clusters. The vector $\{n_{k,l}, \Sigma_{k,l}, s_{k,l} | k=1, \ldots, K\}$, has dimensionality $2 \cdot K + K \cdot \dim$, which is the size of the SS that have to be communicated between the Integrator and each computing unit.

The set of SS presented here is more than sufficient for the simple version of K-Means algorithm. The aggregated quantity, $\Sigma_{k,l}$, could be sent instead of the individual $s_{k,l}$. But there are other variations of K-Means performance functions that require individual $s_{k,l}$, for evaluating the performance functions. Besides, the quantities that dominate the communication cost are $\Sigma_{k,l}$.

The $l^{th}$ computing unit collects the SS, $\{n_{k,l}, \Sigma_{k,l}, s_{k,l}, |k=1,\ldots,K\}$, on the data in its own memory, and then sends them to the Integrator. The Integrator simply adds up the SS from each unit to get the global SS, $$n_k = \sum_{l=1}^{L} n_{k,l}, \quad \Sigma_k = \sum_{l=1}^{L} \Sigma_{k,l}, \quad s_k = \sum_{l=1}^{L} s_{k,l}.$$

The leading cost of integration is $O(K \cdot dim \cdot L)$, where L is the number of computing units. The new location of the $k^{th}$ center is given by $m_k = \Sigma_k/n_k$ from the global SS (this is the I( ) function in (2)), which is the only information all the computing units need to start the next iteration. The performance function is calculated by (proof by direct verification), $$Perf_{KM} = \sum_{l=1}^{L} s_k.$$

The parallel version of the K-Means algorithm gives exactly the same result as the original centralized K-Means because both the parallel version and the sequential version are based on the same global SS except on how the global SS are collected.

K-Harmonic Means Clustering Algorithm

K-Harmonic Means is a clustering algorithm that features an insensitivity to the initialization of the centers. In contrast to the K-Means clustering algorithm whose results depend on finding good initializations, K-Harmonic Means provides good results that are not dependent on finding good initializations.

The iteration step of the K-Harmonic Means algorithm adjusts the new center locations to be a weighted average of all x, where the weights are given by $$1 \bigg/ d_{x,k}^s \left( \sum_{x \in S} \frac{1}{d_{x,l}^2} \right)^2. \tag{8}$$

(K-Means is similar, except its weights are the nearest-center membership functions, making its centers centroids of the cluster.) Overall then, the recursion equation is given by $$m_k = \sum_{x \in S} \frac{x}{d_{x,k}^3 \left( \sum_{l=1}^{K} \frac{1}{d_{x,l}^2} \right)^2} \bigg/ \sum_{x \in S} \frac{1}{d_{x,k}^3 \left( \sum_{l=1}^{K} \frac{1}{d_{x,l}^2} \right)^2}. \tag{9}$$

where $d_{x,k} = \|x - m_k\|$ and s is a constant $\cong 4$. The decomposed functions for calculating SS (see (3) and (4)) are then $$\begin{cases} g_1(x, M) = 1 \bigg/ \sum_{k=1}^{K} \frac{1}{d_{x,k}^2} \\ g_2(x, M) = g_1^2(x, M) \cdot \left( \frac{1}{d_{x,1}^3}, \frac{1}{d_{x,2}^3}, \ldots, \frac{1}{d_{x,K}^3} \right) \\ g_3(x, M) = g_1^2(x, M) \cdot \left( \frac{x}{d_{x,1}^3}, \frac{x}{d_{x,2}^3}, \ldots, \frac{x}{d_{x,K}^3} \right) \end{cases}$$

Each computing unit collects the SS, $$Suff_l = \left\{ \sum_{x \in D_l} g_2(x, M), \sum_{x \in D_l} g_3(x, M) \right\} \tag{11}$$

on the data in its own memory, and then sends it to the Integrator. The size of the SS vector is $K + K \cdot dim$ ($g_3$ is a matrix). The Integrator simply adds up the SS from each unit to get the global SS. The new centers are given by the component-wise quotient:

$$(m_1, m_2, \ldots, m_K) = \sum_{x \in S} g_3(x, M) \bigg/ \sum_{x \in S} g_2(x, M) = \tag{12}$$

$$\sum_{l=1}^{L} \sum_{x \in D_l} g_3(x, M) \bigg/ \sum_{l=1}^{L} \sum_{x \in D_l} g_2(x, M),$$

which is the only information the units need to start the next iteration. This calculation costs $O(K \cdot dim \cdot L)$. The updated global centers are sent to each unit for the next iteration. If broadcasting is an option, this is the total cost in time. If the Integrator finds the centers stop moving significantly, the clustering is considered to have converged to an optimum, and the units are stopped.

Expectation-Maximization (EM) Clustering Algorithm

In this example, the EM algorithm with linear mixing of K bell-shape (Gaussian) functions is described. Unlike K-Means and K-Harmonic Means in which only the centers are to be estimated, the EM algorithm estimates the centers, the co-variance matrices, $\Sigma_k$, and the mixing probabilities, $p(m_k)$. The performance function of the EM algorithm is $$Perf_{EM}(X, M, \Sigma, p) = -\log \tag{13}$$

$$\left\{ \prod_{x \in S} \left[ \sum_{k=1}^{K} p_k \cdot \frac{1}{\sqrt{(2\pi)^D \det(\Sigma_k)}} \cdot EXP\left(-(x - m_k)\Sigma_k^{-1}(x - m_k)^T\right) \right] \right\}$$

where the vector $p = (p_1, p_2, \ldots, p_K)$ is the mixing probability. EM algorithm is a recursive algorithm with the following two steps:

E Step: Estimating "the percentage of x belonging to the $k^{th}$ cluster", $$p(m_k | x) = p(x | m_k) \cdot p(m_k) \bigg/ \sum_{x \in S} p(x | m_k) \cdot p(m_k), \tag{14}$$

where $p(x|m)$ is the prior probability with Gaussian distribution, and $p(m_k)$ is the mixing probability.

$$p(x|m_k) = \frac{1}{\sqrt{(2\pi)^D \det(\Sigma_k)}} \cdot \text{EXP}\left(-(x-m_k)\Sigma_k^{-1}(x-m_k)^T\right) \quad (15)$$

M-Step: With the fuzzy membership function from the E-Step, find the new center locations, new co-variance matrices, and new mixing probabilities that maximize the performance function.

$$m_k = \frac{\sum_{x \in S} p(m_k|x) \cdot x}{\sum_{x \in S} p(m_k|x)}, \quad (16\text{–}18)$$

$$\Sigma_k = \frac{\sum_{x \in S} p(m_k|x) \cdot (x-m_k)^T (x-m_k)}{\sum_{x \in S} p(m_k|x)},$$

$$p(m_k) = \frac{1}{|S|} \sum_{x \in S} p(m_k|x).$$

The functions for calculating the SS are:

$$f_1(x, M, \Sigma, p) = -\log\left[\sum_{l=1}^K p(x|m_k) p(m_k)\right]$$

$$g_1(x, M, \Sigma, p) = (p(m_1|x), p(m_2|x), \ldots, p(m_K|x))$$

$$g_2(x, M, \Sigma, p) = (p(m_1|x)x, p(m_2|x)x, \ldots, p(m_K|x)x)$$

$$g_3(x, M, \Sigma, p) = (p(m_1|x)x^T x, p(m_2|x)x^T x, \ldots, p(m_K|x)x^T x)$$

The vector length (in number of scalars) of the SS is $1+K+K\cdot\text{dim}+K\cdot\text{dim}^2$. The global SS is also the sum of the SS from all units. The performance function value is given by the first global sufficient statistic. The global centers are from the component-wise "ratio" of the third and the second global SS (see (16)), the co-variance matrices from (17) and the mixing probability from (18). All these quantities, $\{m_k, \Sigma_k, p(m_k)|k=1, \ldots, K\}$, have to be propagated to all the units at the beginning of each iteration. The vector length is $K+K\cdot\text{dim}+K\cdot\text{dim}^2$.

There are numerous applications that can utilize the distributed clustering method and system of the present invention to cluster data. For example, these applications include, but are not limited to, data mining applications, customer segmentation applications, document categorization applications, scientific data analysis applications, data compression applications, vector quantization applications, and image processing applications.

The foregoing description has provided examples of the present invention. It will be appreciated that various modifications and changes may be made thereto without departing from the broader scope of the invention as set forth in the appended claims. The distributed clustering method and system described hereinabove is not limited to data clustering algorithms, but can, for example, be applied to distributed parametric estimation applications (e.g., statistical estimation algorithms that use sufficient statistics). Furthermore, the distributed parameter estimation techniques of the present invention can be applied not only to large data sets, but also can be applied to naturally distributed data (e.g., environmental data, geological data, population data, governmental data on a global worldwide scale). Applications to collect, process and analyze the naturally distributed data, can advantageously utilize the distributed parameter estimations techniques of the present invention. These applications can include, for example, geological survey applications, environment monitoring applications, corporate management applications for an international company and economic forecast and monitoring applications.

What is claimed is:

1. A method for clustering data comprising:
   (a) loading each of a plurality of computing units with common global parameter values and a corresponding local data set;
   (b) receiving, by an integrator, from each computing unit, local sufficient statistics based on the local data set and global parameter values; and
   (c) employing the local sufficient statistics of all the computing units to update the global parameter values,
   wherein the local sufficient statistics and the global parameter values support implementation of a distributed K-Harmonic Means clustering algorithm or a distributed Expectation-Maximization clustering algorithm.

2. The method of claim 1 wherein the step of loading each computing unit with common global parameter values and a particular local data set further comprises:
   a_1) receiving a set of data points to be clustered;
   a_2) dividing the data points into at least two local data sets;
   a_3) sending common global parameter values to each of the computing units; and
   a_4) sending each local data sets to a designated computing unit.

3. The method of claim 2 wherein the step of employing the local sufficient statistics of all the computing units to update the global parameter values further comprises:
   c_1) the integrator determining global sufficient statistics based on the local sufficient statistics of all the computing units; and
   c_2) the integrator determining updated global parameter values based on the global sufficient statistics.

4. The method of claim 1 further comprising:
   d) checking a convergence quality;
   e) determining whether the convergence quality meets a predetermined quality; and
   f) when the convergence meets a predetermined quality, stop processing; otherwise;
   g) when the convergence fails to meet a predetermined quality, providing the updated global parameter values to the computing units and repeating steps (a) to (c).

5. The method of claim 2 wherein sending common global parameter values to each of the computing units includes the step of:
   broadcasting common global parameter values to each of the computing units.

6. The method of claim 2 further comprising the step of:
   initializing the common global parameter values before sending the common global parameter values to each of the computing units.

7. The method of claim 1 wherein a distributed K-Harmonic Means clustering algorithm is implemented.

8. The method of claim 1 wherein a distributed Expectation-Maximization (EM) clustering algorithm is implemented.

9. The method of claim 1 wherein the data points to be clustered are naturally distributed.

10. A distributed data clustering system comprising:
(a) a first computing unit that generates a first set of local sufficient statistics based on global parameter values and a first local data set that is a subset of data points to be clustered;
(b) a second computing unit that generates a second set of local sufficient statistics based on global parameter values and a second local data set that is a subset of the data points to be clustered; and
(c) an integrator unit that receives the first and second sets of local sufficient statistics from the first and second computing units, respectively, and that employs the first and second local sufficient statistics to update the global parameter values, wherein the global parameter values include centers, co-variance matrices, and mixing probabilities in accordance with an Expectation-Maximization (EM) clustering algorithm.

11. The distributed data clustering system of claim 10 wherein the first and second local data sets include data points that are naturally distributed.

12. The distributed data clustering system of claim 10 wherein the integrator receives a set of data points to be clustered, divides the data points into at least two local data sets, sends common global parameter values to each of the computing units, and sends each of the local data sets to a designated computing unit.

13. The distributed data clustering system of claim 10,
wherein the integrator unit determines global sufficient statistics based on the local sufficient statistics of the first and second computing units; and
wherein the integrator unit determines updated global parameter values based on the global sufficient statistics.

14. The distributed data clustering system of claim 10 wherein the integrator determines whether a convergence quality meets a predetermined quality, and when the convergence meets a predetermined quality, the integrator stops processing, but while the convergence fails to meet a predetermined quality, the integrator provides updated global parameter values to the computing units.

15. The distributed data clustering system of claim 10 wherein the integrator broadcasts common global parameter values to the first and second computing units.

16. The distributed data clustering system of claim 10 wherein the integrator initializes the common global parameter values before sending the common global parameter values to the first and second computing units.

17. A distributed K Harmonic Means clustering system that comprises:
a plurality of computing units each configured to receive a set of centers, and each further configured to combine the set of centers with a local data set to obtain local sufficient statistics for updating the set of centers in accordance with the K Harmonic Means clustering algorithm;
at least one integrator unit configure to combine the local sufficient statistics from each of the plurality of computing units to obtain global sufficient statistics, and further configured to use the global sufficient statistics to update the set of centers in accordance with the K Harmonic Means clustering algorithm.

18. The system of claim 17, wherein the local sufficient statistics include a dynamically-weighted sum of inverse distances for each center in the set of centers, and a dynamically-weighted sum of data components for each center in the set of centers.

* * * * *

UNITED STATES PATENT AND TRADEMARK OFFICE
CERTIFICATE OF CORRECTION

PATENT NO. : 7,039,638 B2  Page 1 of 1
APPLICATION NO. : 09/844730
DATED : May 2, 2006
INVENTOR(S) : Bin Zhang et al.

It is certified that error appears in the above-identified patent and that said Letters Patent is hereby corrected as shown below:

In column 8, line 32, delete ", . . . ," before "stands".

In column 9, line 52, delete "$1^{th}$" and insert -- $I^{th}$ --, therefor.

In column 9, line 53, delete "$1^{th}$" and insert -- $I^{th}$ --, therefor.

In column 10, line 67, delete "$\Sigma_{k,l}$," and insert -- $\Sigma_k s_{k,l}$ --, therefor.

In column 16, line 22, in Claim 17, delete "configure" and insert -- configured --, therefor.

Signed and Sealed this

Second Day of June, 2009

JOHN DOLL
*Acting Director of the United States Patent and Trademark Office*